(12) United States Patent
Kerr et al.

(10) Patent No.: US 9,400,553 B2
(45) Date of Patent: Jul. 26, 2016

(54) USER INTERFACE PROGRAMMATIC SCALING

(71) Applicant: Microsoft Technology Licensing, LLC, Redmond, WA (US)

(72) Inventors: Bernard James Kerr, Sausalito, CA (US); Edward Elliott, San Francisco, CA (US); Morgan Kolya Venable, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 31 days.

(21) Appl. No.: 14/051,890

(22) Filed: Oct. 11, 2013

(65) Prior Publication Data

US 2015/0103003 A1 Apr. 16, 2015

(51) Int. Cl.
*G06F 3/01* (2006.01)
*G06F 3/0481* (2013.01)
*G06F 3/0488* (2013.01)

(52) U.S. Cl.
CPC .............. *G06F 3/013* (2013.01); *G06F 3/0481* (2013.01); *G06F 3/0488* (2013.01); *G06F 3/04812* (2013.01); G06F 2203/04101 (2013.01); G06F 2203/04805 (2013.01); G06F 2203/04806 (2013.01)

(58) Field of Classification Search
None
See application file for complete search history.

(56) References Cited

U.S. PATENT DOCUMENTS

| 8,472,665 | B2 | 6/2013 | Hildreth |
| 2005/0047629 | A1 | 3/2005 | Farrell et al. |
| 2011/0175932 | A1* | 7/2011 | Yu et al. ........................ 345/661 |
| 2011/0254865 | A1 | 10/2011 | Yee et al. |
| 2011/0285657 | A1 | 11/2011 | Shimotani et al. |
| 2012/0105486 | A1 | 5/2012 | Lankford et al. |
| 2012/0257035 | A1 | 10/2012 | Larsen |
| 2012/0295708 | A1* | 11/2012 | Hernandez-Abrego et al. ............................... 463/36 |
| 2012/0326963 | A1 | 12/2012 | Minnen |
| 2012/0327125 | A1 | 12/2012 | Kutliroff et al. |
| 2013/0014052 | A1 | 1/2013 | Frey et al. |
| 2013/0169560 | A1 | 7/2013 | Cederlund et al. |

FOREIGN PATENT DOCUMENTS

WO 2006003586 A2 1/2006

OTHER PUBLICATIONS

Fono, et al., "EyeWindows: Evaluation of Eye-Controlled Zooming Windows for Focus Selection", In Proceedings of the SIGCHI Conference on Human Factors in Computing Systems, Apr. 2, 2005, 10 pages.

(Continued)

*Primary Examiner* — Kenneth B Lee, Jr.
(74) *Attorney, Agent, or Firm* — Dave Ream; Tom Wong; Micky Minhas

(57) ABSTRACT

Embodiments that relate to scaling a visual element displayed via a display device are disclosed. In one embodiment a method includes receiving and using gaze tracking data to determine gaze locations at which a user is gazing on the display device. Depth tracking data is received and used to determine that a user's pointer is at a predetermined location. In response, a locked gaze location on the screen is locked, where the locked gaze location includes at least a portion of the visual element. In response to locking the locked gaze location, the visual element is programmatically scaled by a predetermined amount to an enlarged size. A user input selecting the visual element is then received.

18 Claims, 12 Drawing Sheets

(56) References Cited

OTHER PUBLICATIONS

"Gaze-Enhanced User Interface Design", Manu Kumar, Retrieved on Aug. 1, 2013, Available at: http://hci.stanford.edu/research/GUIDe/, 3 pages.

ISA European Patent Office, International Search Report and Written Opinion Issued in PCT Patent Application No. PCT/US2014/059380, Jan. 29, 2015, WIPO, 12 Pages.

IPEA European Patent Office, Second Written Opinion Issued in Application No. PCT/US2014/059380, Nov. 30, 2015, WIPO, 7 Pages.

IPEA European Patent Office, International Preliminary Report on Patentability Issued in Application No. PCT/US2014/059380, Feb. 4, 2016, WIPO, 8 pages.

* cited by examiner

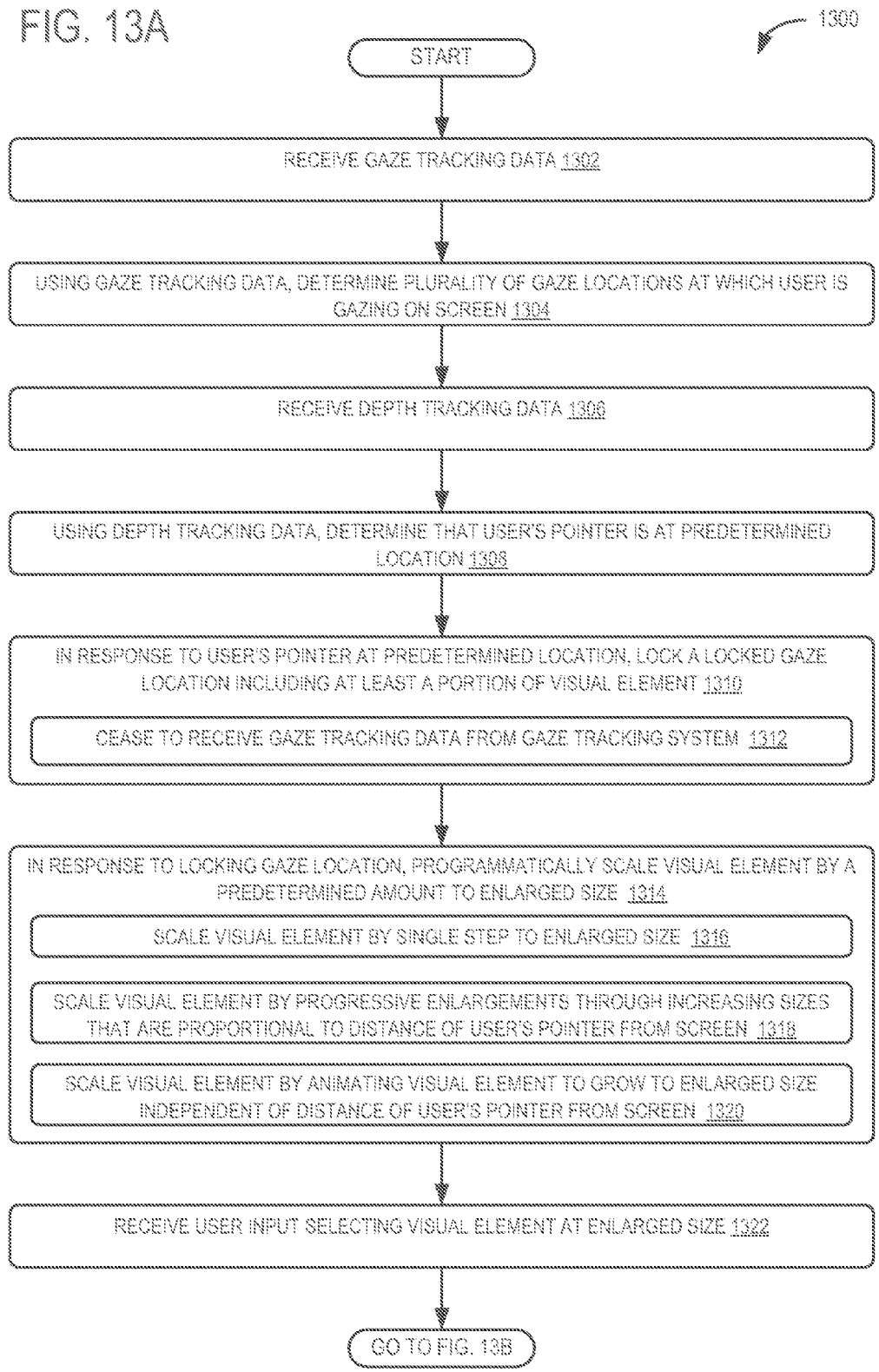

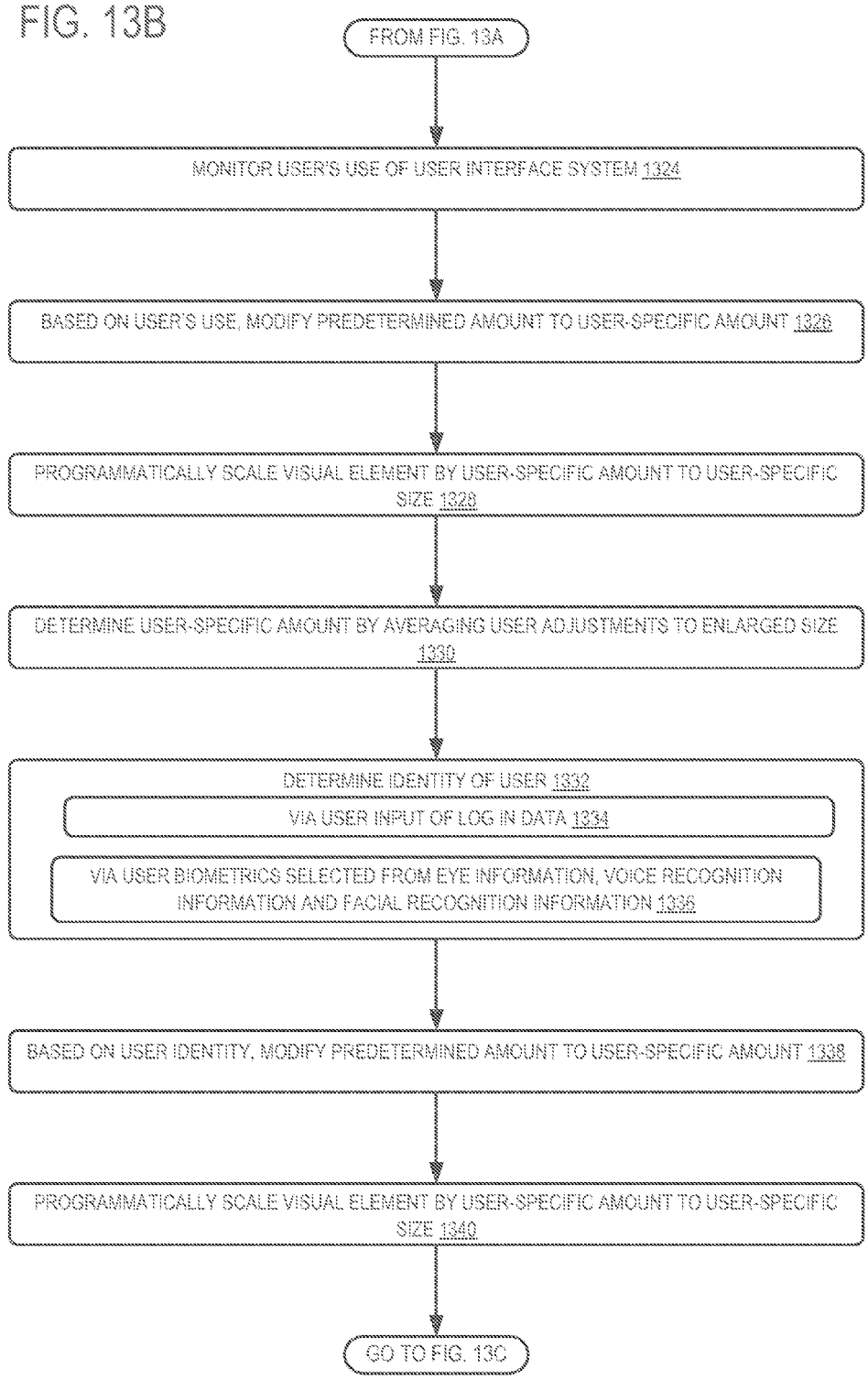

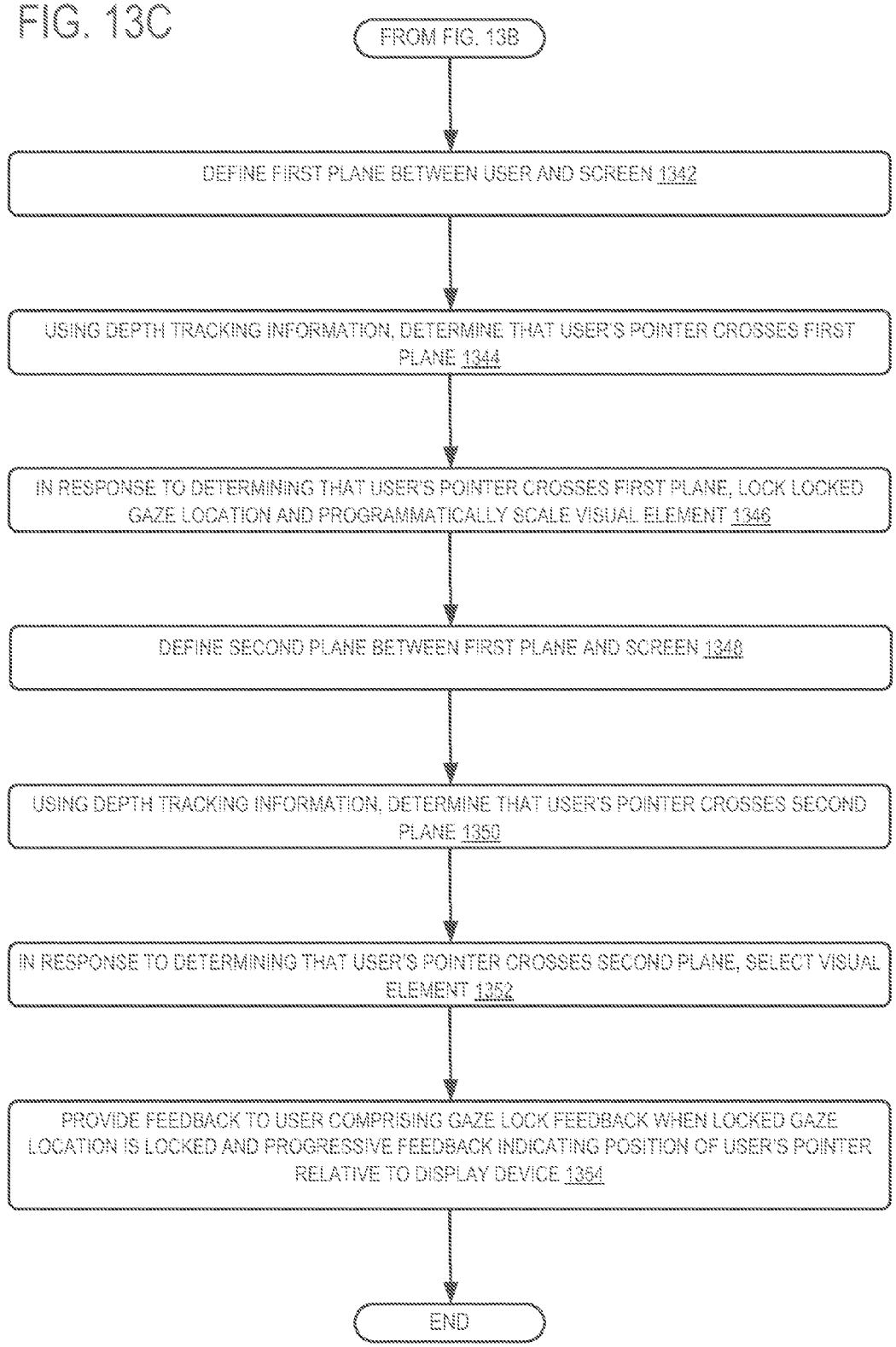

USER INTERFACE PROGRAMMATIC SCALING

BACKGROUND

Navigating electronic content to find and select relevant portions of the content is an often repeated task. In many examples, content items are displayed to a user via a display device associated with a computing device. Some content items may be selectable by the user via an input device or other mechanism. With touch screen devices, for example, a user may select a selectable content item by touching a location on the touch screen where the content item is displayed.

In some cases, however, selectable content items may be displayed in a size too small to allow for effective touch selection. For example, where two or more selectable content items are displayed close together and in a small size, touching only the desired item without also touching an adjacent item may be difficult or especially tedious. To address this concern, some touch screen devices enable the user to enlarge a displayed content item via touch gestures on the screen, such as double-tapping a location or performing a reverse-pinch-to-zoom gesture in which the user expands the distance between the thumb and index finger while contacting the screen.

Using such touch gestures to enlarge the content item, however, entails additional effort and movement by the user to ready the display and the desired item for selection. Performing such gestures also increases the delay between the user forming an intention to select an item and the actual selection of the item. Additionally, such touch gestures may be ill suited or even nonfunctional for other user interfaces associated with different devices, such as televisions, wall-mounted displays, wearable displays, and the like.

SUMMARY

Various embodiments are disclosed herein that relate to systems and methods for scaling a visual element displayed via a display device. For example, one disclosed embodiment provides a method for scaling a visual element that includes receiving and using gaze tracking data to determine a plurality of gaze locations at which a user is gazing on a screen of a display device. Depth tracking data is received and used to determine that a user's pointer is at a predetermined location.

In response to determining that the user's pointer is at the predetermined location, a locked gaze location on the screen is locked. The locked gaze location includes at least a portion of the visual element. In response to locking the locked gaze location, the visual element is programmatically scaled by a predetermined amount to an enlarged size. A user input selecting the visual element is then received.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 13A, 13B and 13C are a flow chart of a method for scaling a visual element displayed via a display device according to an embodiment of the present disclosure.

DETAILED DESCRIPTION

Figure 1:
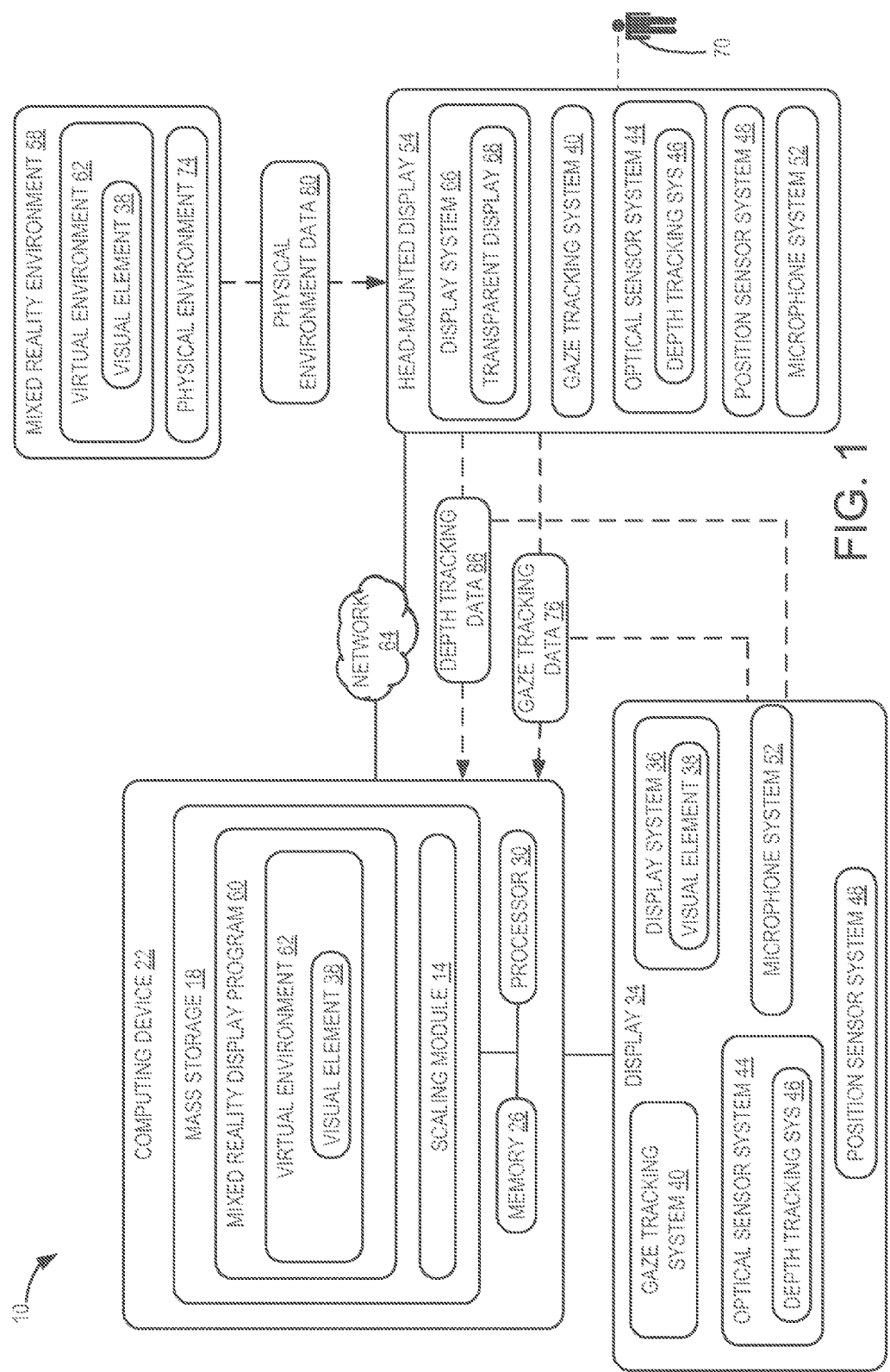
FIG. 1 is a schematic view of a user interface system for scaling a visual element according to an embodiment of the present disclosure.

FIG. 1 shows a schematic view of one embodiment of a user interface system 10 for scaling a visual element displayed via a display device. The user interface system 10 includes a scaling module 14 that may be stored in mass storage 18 of a computing device 22. The scaling module 14 may be loaded into memory 26 and executed by a processor 30 of the computing device 22 to perform one or more of the methods and processes described in more detail below.

The user interface system 10 may include a display device that is operatively connected to computing device 22. In some examples, the display device may comprise a separate display 34, such as a standalone monitor, wall-mounted display, interactive whiteboard, etc., that is operatively connected to computing device 22 via a wired or wireless connection. As described in more detail below, display 34 may include one or more of a display system 36 for presenting one or more visual elements 38 to a user, a gaze tracking system 40, an optical sensor system 44, a depth tracking system 46, a position sensor system 48, and a microphone system 52.

In other examples, computing device 22 may be integrated into the display 34 to form a single device. Such devices may include, for example, hand-held smart phones, e-readers, laptop, notebook and tablet computers, etc. It will be appreciated that many other types and configurations of display devices having various form factors, whether separate from or integrated with computing device 22, may also be used and are within the scope of the present disclosure.

The computing device 22 may take the form of a desktop computing device, a mobile computing device such as a smart phone, laptop, notebook or tablet computer, network computer, home entertainment computer, interactive television, gaming system, or other suitable type of computing device.

Additional details regarding the components and computing aspects of the computing device 22 are described in more detail below with reference to FIG. 14.

In other examples, the display device may take the form of a virtual or mixed-reality capable device, such as head-mounted display (HMD) device 54, that may create a mixed reality environment 58. In these examples, the user interface system 10 may include a mixed reality display program 60 that may generate a virtual environment 62 for display via HMD device 54. The virtual environment 62 may include one or more visual elements 38 in the form of virtual images, such as three-dimensional (3D) holographic objects and two-dimensional (2D) virtual images, that are generated and displayed via HMD device 54.

The computing device 22 may be operatively connected with the HMD device 54 using a wired connection, or may employ a wireless connection via WiFi, Bluetooth, or any other suitable wireless communication protocol. For example, the computing device 22 may be communicatively coupled to a network 64. The network 64 may take the form of a local area network (LAN), wide area network (WAN), wired network, wireless network, personal area network, or a combination thereof, and may include the Internet. Additionally, the example illustrated in FIG. 1 shows the computing device 22 as a separate component from the HMD device 54. It will be appreciated that in other examples the computing device 22 may be integrated into the HMD device 54.

Figure 2:
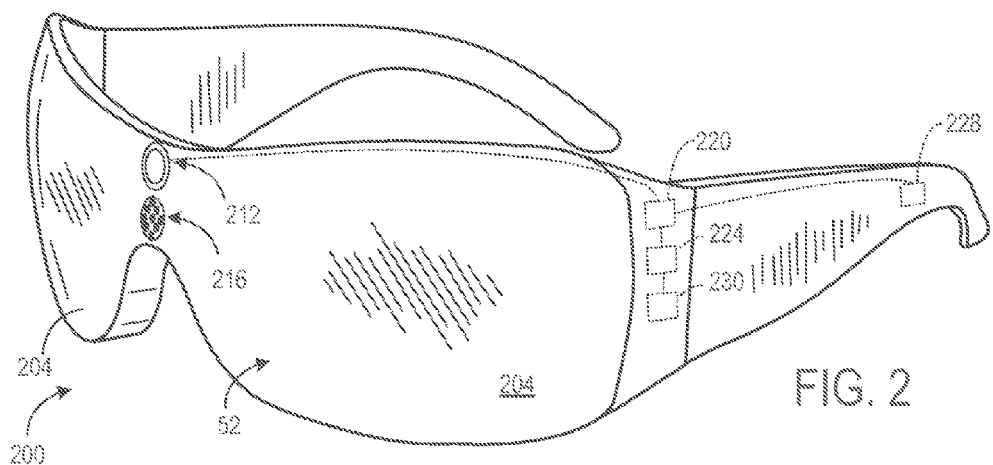
FIG. 2 shows an example head-mounted display device according to an embodiment of the present disclosure.

With reference now also to FIG. 2, one example of an HMD device 200 in the form of a pair of wearable glasses with a transparent display 68 is provided. It will be appreciated that in other examples, the HMD device 200 may take other suitable forms in which a transparent, semi-transparent or non-transparent display is supported in front of a viewer's eye or eyes. It will also be appreciated that the HMD device 54 shown in FIG. 1 may take the form of the HMD device 200, as described in more detail below, or any other suitable HMD device.

With reference to the example shown in FIGS. 1 and 2, the HMD device 54 includes an HMD display system 66 and transparent display 68 that enables images such as holographic objects to be delivered to the eyes of a user 70. The transparent display 68 may be configured to visually augment an appearance of a physical environment 74 to a user 70 viewing the physical environment through the transparent display. For example, the appearance of the physical environment 74 may be augmented by graphical content (e.g., one or more pixels each having a respective color and brightness) that is presented via the transparent display 68 to create the mixed reality environment 58.

The transparent display 68 may also be configured to enable a user to view a physical, real-world object in the physical environment 74 through one or more partially transparent pixels that are displaying a virtual object representation. As shown in FIG. 2, in one example the transparent display 68 may include image-producing elements located within lenses 204 (such as, for example, a see-through Organic Light-Emitting Diode (OLED) display). As another example, the transparent display 68 may include a light modulator on an edge of the lenses 204. In this example the lenses 204 may serve as a light guide for delivering light from the light modulator to the eyes of a user. Such a light guide may enable a user to perceive a 3D holographic image located within the physical environment 74 that the user is viewing, while also allowing the user to view physical objects in the physical environment, thus creating a mixed reality environment.

The HMD device 54 along with the display 34 may also include various sensors and related systems. For example, the HMD device 54 and display 34 may include a gaze tracking system 40 that includes one or more image sensors configured to acquire image data in the form of gaze tracking data 76 from a user's eyes. Provided the user has consented to the acquisition and use of this information, the gaze tracking system 40 may use this information to track a position and/or movement of the user's eyes.

In one example, the gaze tracking system 40 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the gaze tracking system 40 may then determine a direction and/or at what location, physical object, and/or virtual object the user is gazing. The gaze tracking system 40 may further determine at what location on a physical or virtual object the user is gazing. Such gaze tracking data 76 may then be provided to the computing device 22. In some examples, the gaze tracking system 40 may also be used to identify the user via iris recognition, retinal scanning, or other suitable eye-related biometric identification technique.

It will be understood that the gaze detection subsystem may have any suitable number and arrangement of light sources and image sensors. For example and with reference to FIG. 2, the gaze tracking system 40 of the HMD device 200 may utilize at least one inward facing sensor 212.

The HMD device 54 and display 34 may also include sensor systems that receive physical environment data 80 from the physical environment 74. For example, the HMD device 54 and display 34 may include an optical sensor system 44 that utilizes one or more outward facing sensors, such as optical sensor 216 on HMD device 200, to capture image data. The outward facing sensor(s) may detect movements within its field of view, such as gesture-based inputs or other movements performed by a user 70 or by a person or physical object within the field of view. The outward facing sensor(s) may also capture 2D image information and depth information from physical environment 74 and physical objects within the environment. For example, the outward facing sensor(s) may include a depth camera, a visible light camera, an infrared light camera, and/or a position tracking camera.

The optical sensor system 44 may include a depth tracking system 46 that generates depth tracking data 86 via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

The outward facing sensor(s) may capture images of the physical environment 74 in which a user 70 is situated. With respect to the HMD device 54, in one example the mixed reality display program 60 may include a 3D modeling system that uses such captured images to generate a virtual environment 62 that models the physical environment 74 surrounding the user 70.

The HMD device 54 and display 34 may also include a position sensor system 48 that utilizes one or more motion sensors, such as motion sensors 220 on HMD device 200, to capture position data and thereby enable motion detection, position tracking and/or orientation sensing of the HMD device and display 34. In the example of the HMD device 54, the position sensor system 48 may be utilized to determine a direction, velocity and acceleration of a user's head. The position sensor system 48 may also be utilized to determine a head pose orientation of a user's head. In one example, position sensor system 48 may comprise an inertial measurement unit configured as a six-axis or six-degree of freedom position sensor system. This example position sensor system may, for example, include three accelerometers and three gyroscopes to indicate or measure a change in location of the HMD device 54 or display 34 within 3D space along three orthogonal axes (e.g., x, y, z), and a change in an orientation of the HMD device or display about the three orthogonal axes (e.g., roll, pitch, yaw).

Position sensor system 48 may also support other suitable positioning techniques, such as GPS or other global navigation systems. Further, while specific examples of position sensor systems have been described, it will be appreciated that other suitable position sensor systems may be used. In some examples, motion sensors may also be employed as user input devices, such that a user may interact with the HMD device 54 or display 34 via motion of the hands, body, neck and/or head. The HMD device 54 and display 34 may also include a microphone system 52 that includes one or more microphones, such as microphones 224 on HMD device 200, that capture audio data. In other examples, audio may be presented to the user via one or more speakers, such as speakers 228 on the HMD device 200.

The HMD device 200 and display 34 may also include a processor, such as processor 230 on the HMD device. The processor includes a logic subsystem and a storage subsystem, as discussed in more detail below with respect to FIG. 14, that are in communication with the various sensors and systems of the HMD device and display. In one example, the storage subsystem may include instructions that are executable by the logic subsystem to receive signal inputs from the sensors and forward such inputs to computing device 22 (in unprocessed or processed form), and to present images to a user via the display 34 or HMD device 200.

It will be appreciated that the display 34, HMD device 200 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the display 34 and HMD device 200 may include additional and/or alternative sensors, cameras, microphones, input devices, output devices, etc. without departing from the scope of this disclosure. Further, the physical configuration of the display 34 and HMD device 200 and their various sensors and subcomponents may take a variety of different forms without departing from the scope of this disclosure.

Figure 3:
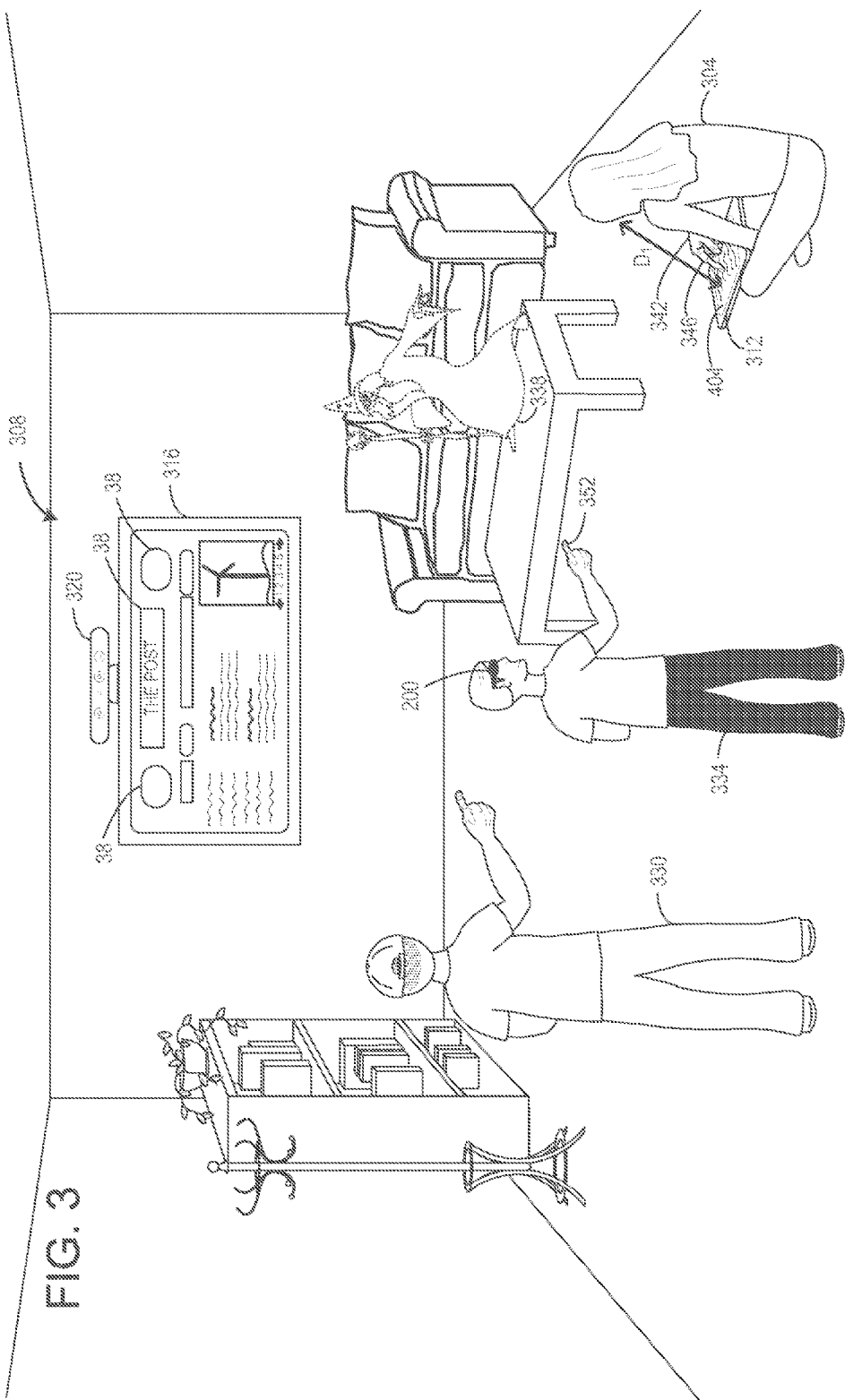
FIG. 3 is a schematic perspective view of a room including a user holding a tablet computer, a user wearing the head-mounted display device of FIG. 2, and a user interacting with a wall-mounted display.

With reference now to FIGS. 3-12, descriptions of example use cases and embodiments of the user interface system 10 will now be provided. FIG. 3 provides a schematic illustration of a first user 304 located in a physical environment that comprises a family room 308. The first user 304 is shown holding a display 34 in the form of a touch screen tablet computer 312 that includes user interface system 10 and a gaze tracking system 40 and depth tracking system 46 as described above. As discussed in more detail below, scaling module 14 may be configured to display and programmatically scale one or more visual elements 38 via touch screen tablet computer 312 using gaze tracking data 76 and depth tracking data 86.

The family room 308 may also include a wall-mounted display 316 that may be operatively connected to a gaming system 320. The gaming system 320 and/or display 316 may also include user interface system 10 and a gaze tracking system 40 and depth tracking system 46 as described above. A second user 330 may interact with visual elements 38 displayed on the wall-mounted display 316 via user interface system 10 as described in more detail below.

A third user 334 may experience a mixed reality environment 58 via an HMD device 200 as described above. The third user 334 may interact with visual elements, such as 3D virtual image 338, displayed via the HMD device 200 using the user interface system 10 described herein. For purposes of the following description, use cases of the user interface system 10 in connection with the tablet computer 312, wall-mounted display 316 and HMD device 200 will be described. It will also be appreciated that any suitable display device incorporating the user interface system 10 may also be utilized.

Figure 4:
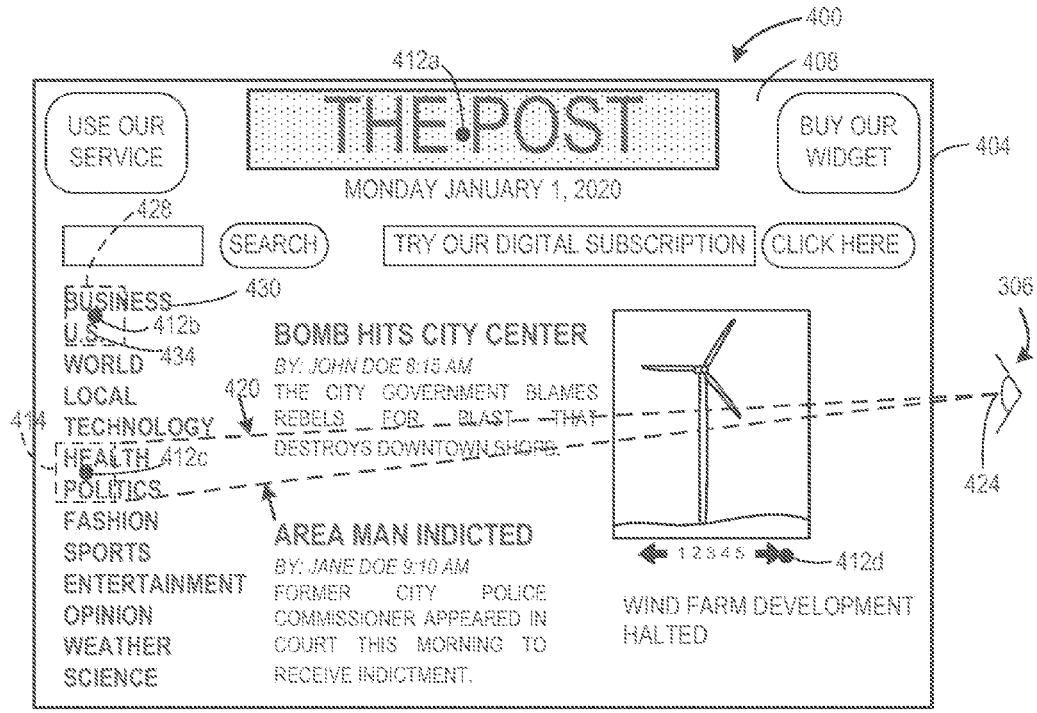
FIG. 4 is a schematic view of a display device screen that is displaying visual elements from a webpage.

With reference now to FIG. 4, a schematic view of one example of a plurality of visual elements that are displayed on a display screen 404 of a display device is provided. In this example, the visual elements comprise a news source web page 400. For purposes of the present example, the display screen 404 will be described as the touch screen of the tablet computer 312 shown in FIG. 3. It will also be appreciated that the principles of the present example may apply to other display devices, such as the wall-mounted display 316 and the HMD device 200 shown in FIG. 3. Further, it will be appreciated that the principles of the present disclosure may apply to a variety of content displayed via a display device including, but not limited to, web pages, video game graphics, streaming content including movies, video calls or chats, online meetings, presentations and other interactive collaborations, and the like, two-dimensional and three-dimensional holographic images, and any other suitable content displayed via a display device.

As first user 304 reads the web page 400, the user's eyes will scan across the surface 408 of the display screen 404 at various gaze locations, with gaze locations 412a, 412b, 412c and 412d being shown. Using gaze tracking data 76 from the gaze tracking system 40 of tablet computer 312, the scaling module 14 may be configured to determine the gaze locations at which the user is gazing on the display screen 404. As shown in FIG. 4, in some examples the gaze tracking system may determine a gaze location in the form of a point located on the display screen 404. It will be appreciated that the gaze location may not be displayed to the user.

It will also be appreciated that the human eye undergoes natural, involuntary movements such as, for example, saccades, microsaccades, jitter, tremors, and drifts. Such natural movements may impact an accuracy of a gaze tracking system. Accordingly, to account for accuracy constraints of a gaze tracking system and/or to approximate the actual gaze location of a user, in some examples a gaze box centered on a gaze location may be determined.

With reference to FIG. 4, in one example a gaze box 414 may have a height that corresponds to an angle 420 having an apex 424 extending from a point at or near the user's eyes to the screen. FIG. 4 schematically illustrates an eye 306 of first user 304 and gaze location 412c that corresponds to subtended angle 420. In the example shown in FIG. 4, the gaze box 414 is a square. In other examples, the gaze box may be a rectangle having a width different from the height. In still other examples, other shapes and configurations may be determined and utilized to account for accuracy capabilities of a gaze tracking system and/or to approximate the actual gaze location of a user.

It will be appreciated that the size of a gaze box on the surface 408 of screen 404 will depend upon the distance between the surface and the apex 424 of the angle corresponding to the gaze location box. As illustrated in FIG. 3, this distance may vary depending upon the type of display device being used and the position of the corresponding user. For example, in FIG. 4 where the angle 420 is approximately 1 degree and the first user 304 holds the tablet computer 312 a distance D1 of approximately 400 mm from the user's eyes, the corresponding gaze location box on the tablet computer display surface 408 will have a height of approximately 17 mm.

Where the angle 420 is approximately 1 degree, other examples of a distance between a display surface and the eyes of a user, and the corresponding height of the gaze location box, include but are not limited to a 100 mm distance and a 4 mm height, a 200 mm distance and an 8 mm height, a 300 mm distance and a 13 mm height, a 500 mm distance and a 21 mm height, a 600 mm distance and a 25 mm height, a 700 mm distance and a 29 mm height, an 800 mm distance and a 33 mm height, a 1000 mm distance and a 42 mm height, a 1200 mm distance and a 50 mm height, a 1600 mm distance and a 67 mm height, and an 1800 mm distance and a 75 mm height. It will be appreciated that for an angle 420 of approximately 1 degree, other distance/height combinations may be used that correspond to an approximate ratio of distance/height=24. It will also be appreciated that other distance/height combinations corresponding to other values of angle 420 may also be utilized.

To increase the likelihood that the gaze detection box falls on a single visual element on the display surface, in one example each visual element on the display surface may be sized to have a height of at least the height of the gaze detection box. In some examples, however, one or more visual elements may not have a height equal to or larger than the height of the gaze detection box. In these examples, and depending upon the size of the gaze detection box relative to the display surface area, 2, 3, 4 or more visual elements may be fully or partially enclosed by the gaze detection box. For example and with reference to FIG. 4, gaze detection box 428 falls on 2 selectable visual elements, the Business hyperlink 430 and the U.S. hyperlink 434. In this situation, using gaze detection to determine which of the multiple visual elements the user is interested in may be difficult.

For touch screen devices, another consideration may be the size of a selectable visual element with respect to the size of a user's finger that will be touching the touch surface of the device. In one example, an estimate of a surface area on the touch surface that is contacted when a user's finger touches the surface may be determined. Using this estimate, a minimum visual element size may then be determined. In one example, the minimum visual element size may correspond to the estimated surface area in a manner that increases the likelihood that a user intending to touch a location on the screen at which a particular visual element is displayed will consistently succeed in touching a location corresponding to the particular visual element. In one example, using empirical data of touch screen surface areas contacted by various users' fingers during touch screen selection contacts, a minimum visual element size may be defined as a 9 mm height.

Figure 5:
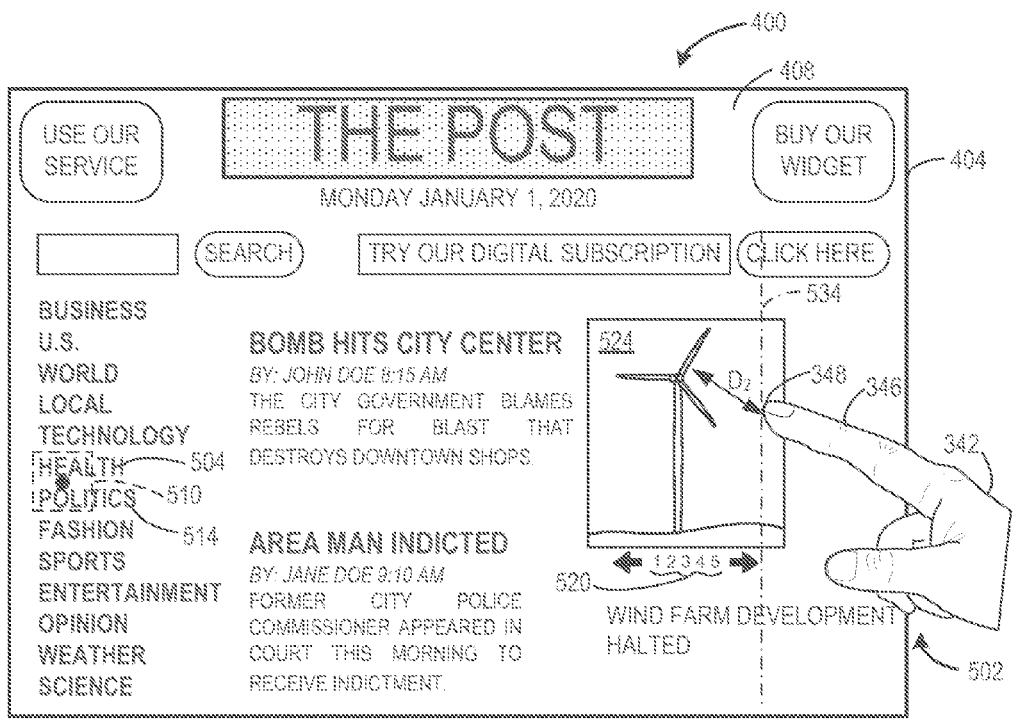
FIG. 5 is a schematic view of the screen of FIG. 4 showing a user's hand moving toward the screen.
Figure 6:
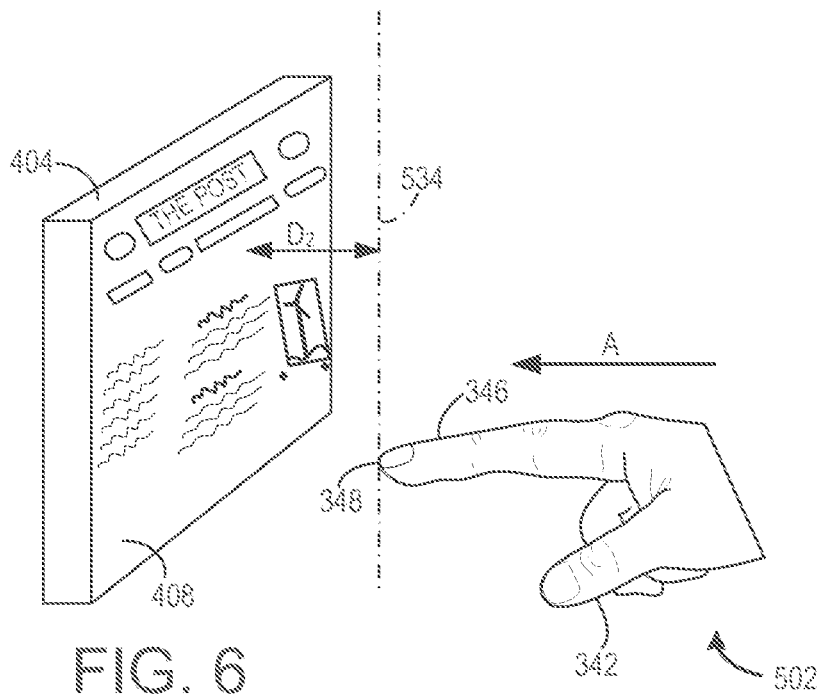
FIG. 6 is a schematic perspective view of the screen and user's hand of FIG. 5.
Figure 7:
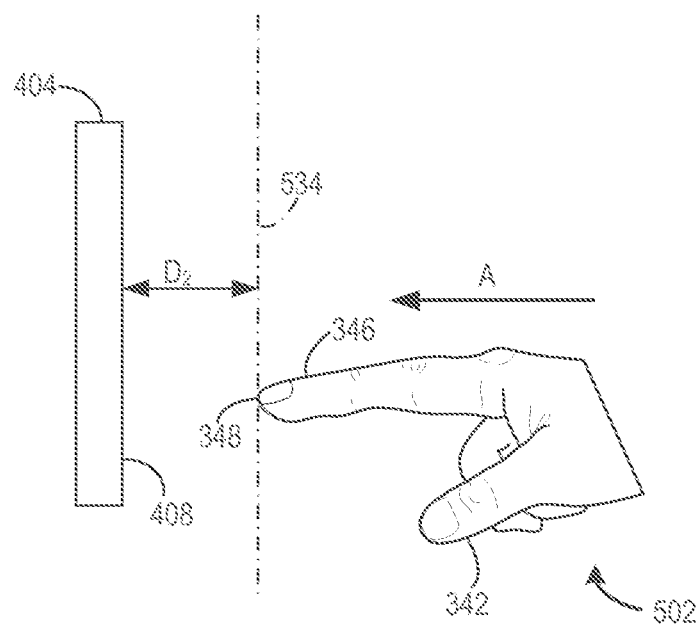
FIG. 7 is a schematic side view of the screen and user's hand of FIG. 5.
Figure 8:
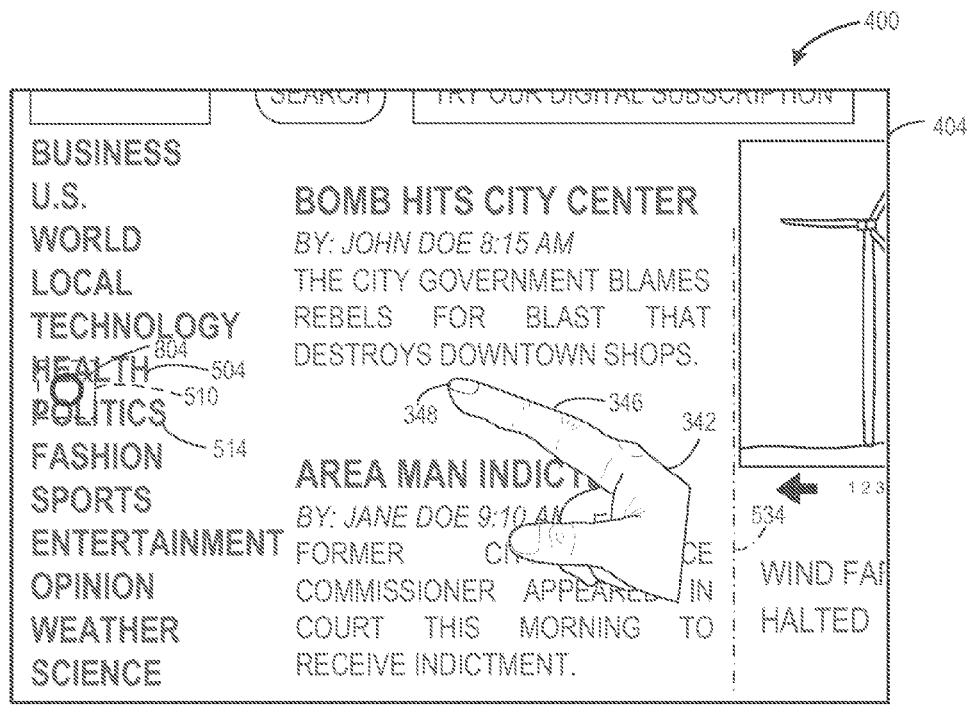
FIG. 8 is a schematic view of the screen of FIG. 5 showing the user's hand closer to the screen and the visual elements enlarged.

As noted above, as the first user 304 scans the web page 400, the gaze tracking system 40 may generate gaze tracking data 76 that corresponds to various gaze locations on the display screen at which the user is gazing over time. With reference now to FIG. 5, in one example the first user 304 desires to select the Health hyperlink 504 visual element and navigate to the Health page of the news source. As the first user 304 looks at the Health hyperlink 504 visual element, the user moves a user pointer (in this example, her hand 342 with index finger 346 extended) toward the display screen 404. The depth tracking system 46 generates depth tracking data 86 corresponding to the position of the user's hand 342. It will be appreciated that other types of user pointers may be used to interact with the touch screen table computer 312. Examples of other user pointers may include, but are not limited to, a stylus, pen or pencil, or any other pointing instrument or item that is manipulated by a user.

Using the depth tracking data 86, the scaling module 14 may determine that the user's hand 342 is at a predetermined location. In one example, the predetermined location may be a predetermined distance from a point on the user's hand 342 to the surface 408 of the display screen 404. For example, a predetermined distance D2 may correspond to the distance from the tip 348 of the user's index finger 346 to the surface 408 of the display screen 404. Example values of the predetermined distance may be 100 mm, 150 mm, 200 mm, or any other suitable distance. In another example and with reference to the third user 334 in FIG. 3 wearing HMD device 200, the predetermined location may comprise the second user's index finger 352 pointing towards a virtual screen or virtual image, such as virtual image 338, that is generated by the HMD device. In some examples the predetermined location may further comprise a predetermined distance from the tip of the second user's index finger 352 to the virtual screen or virtual image.

In response to determining that the user's hand is at the predetermined location, the scaling module 14 locks a locked gaze location on the display screen 404 that corresponds to the current gaze location of the user as determined by the gaze tracking system 40. In the example of FIG. 5, gaze tracking system 40 may determine that the first user 304 is looking at the screen location corresponding to the gaze location 412c in FIG. 4 when the user's hand is at a predetermined location indicated at 502. Accordingly, the scaling module 14 creates locked gaze location 510 at this location. In the example of FIG. 5, the locked gaze location 510 corresponds to the gaze box 414 shown in FIG. 4. In other examples, the locked gaze location may correspond to a gaze location point, such as gaze location 412c, or to other shapes or bounding areas that may approximate the actual gaze location of a user or capture a neighborhood around an estimated gaze location.

As noted above, 2, 3, 4 or more visual elements 38 may be fully or partially enclosed by a locked gaze location. In the example shown in FIG. 5, the Health hyperlink 504 selectable visual element and a Politics hyperlink 514 selectable visual element are partially enclosed by the locked gaze location 510. In some examples, the locked gaze location 510 may be displayed and visible to the user. In other examples the locked gaze location 510 may not be displayed or visible to the user.

In some examples, in response to determining that the user's hand is at the predetermined location, the scaling module 14 may cause the gaze tracking system 40 to cease gathering and/or sending gaze tracking data 76 to the scaling module 14. Advantageously and in this example, by causing the gaze tracking system 40 to cease gathering and/or sending gaze tracking data 76, power, battery life, and/or computational resources of the corresponding display device may be preserved.

In other examples, the gaze tracking system 40 may be normally disabled, and may be enabled when a user's hand is sensed by the optical sensor system 44. For example and as described in more detail below, the gaze tracking system 40 may be enabled when the user's hand is sensed moving toward the display screen 404 and breaking a virtual plane between the user's eyes and the screen. In some examples, the gaze tracking system 40 may be subsequently disabled when the user's hand breaks a second virtual plane that triggers a selection of a visual element 38, or when a visual element is selected by other means. In other examples, the gaze tracking system 40 may be subsequently disabled when the user's hand moves away from the screen by a predetermined distance.

Once the user's hand has been identified to be at the predetermined location and the locked gaze location 510 has been created, the scaling module 14 may proceed to scale one or more visual elements as described in more detail below. More particularly, in response to locking the locked gaze location 510, the scaling module 14 may programmatically scale the Health hyperlink 504 and Politics hyperlink 514 visual elements by a predetermined amount to an enlarged size.

In one example and prior to the programmatic scale, the Health hyperlink 504 selectable visual element may be displayed on the display screen 404 in a default size that is smaller than a minimum visual element size needed for accurate touch selection, such as a 9 mm height. For example, the Health hyperlink 504 selectable visual element may be displayed having a 6 mm height. Similarly, the Politics hyperlink 514 selectable visual element that is immediately below the Health hyperlink 504, may also be displayed having a 6 mm height.

Advantageously, and in response to locking the locked gaze location 510, the scaling module 14 may programmatically scale the Health hyperlink 504 and Politics hyperlink 514 selectable visual elements, which are partially enclosed by the locked gaze location 510, by a predetermined amount to an enlarged size that is greater than or equal to a 9 mm height. In this manner and prior to the user's finger 346 contacting the display surface 408, the Health hyperlink 504 that the user desires to select may be enlarged to a size that enables accurate touch selection of this link. The user may then provide user input by touching and thereby selecting the Health hyperlink 504 at the enlarged size.

In one example, the scaling module 14 may programmatically scale the entire webpage 400 and all selectable and non-selectable visual elements 38 of the webpage by a predetermined scale factor to an enlarged size. In one example, the webpage 400 and all of its visual elements 38 may be proportionally enlarged by a predetermined scale factor that corresponds to a ratio of a minimum visual element size needed for accurate touch selection to the size of the smallest selectable visual element displayed on the webpage 400.

As noted above, in one example a minimum visual element size needed for accurate touch selection may be 9 mm. A smallest selectable visual element displayed on the webpage 400 may be, for example, 6 mm. In this example, the predetermined scale factor is 9 mm/6 mm=1.5 or 50% scaling. Accordingly, all of the visual elements 38 in the webpage 400 may be enlarged to 1.5 times their initial size. It will be appreciated that various other scale factors will correspond to different minimum visual element sizes needed for accurate touch selection and different smallest visual element sizes on a display.

In another example, instead of utilizing the smallest selectable visual element displayed anywhere on the webpage 400, the scaling module 14 may utilize a predefined neighborhood surrounding the current gaze location to select the smallest selectable visual element. For example and with reference to FIG. 5, the selectable visual elements that are at least partially overlapped by locked gaze location 510 may be examined to determine the smallest selectable visual element.

It will be appreciated that any other suitable neighborhood or predefined location surrounding the gaze location may also be utilized in determining the predetermined scale factor. It will also be appreciated that in other examples, the predetermined scale factor may be determined in any other suitable manner. Further, the predetermined scale factor may be determined based on one or more other considerations such as, for example, a distance from the user's eyes to the physical or virtual display screen or projected virtual object.

In one example, the scaling module 14 may programmatically scale the visual elements 38 by a single step to the enlarged size. For example and with reference to FIG. 12, the visual elements including the Health hyperlink 504 and Politics hyperlink 514 selectable visual elements are enlarged as compared to the size of the visual elements as shown in FIG. 5. In this example, the visual elements including the Health hyperlink 504 and Politics hyperlink 514 selectable visual elements may remain in this enlarged size as the user's finger 346 moves closer to the display screen 404 to touch and select the Health hyperlink 504. Alternatively expressed, in this example the enlarged size of the visual elements 38 is independent of the distance of the user's finger 346 and hand 342 from the display screen 404.

In another example, the scaling module 14 may animate the visual elements 38 to grow in a continuous manner from an initial size to the enlarged size. In this example, instead of scaling the visual elements 38 by a single step to the enlarged size, the scaling module 14 may animate the dimensional changes to the elements using, for example, an easing function to create a smooth zooming effect. Additionally, in this example the visual elements may grow in a continuous manner from the initial to the enlarged size independent of a distance of the user's hand from the screen.

In another example, the scaling module 14 may programmatically scale the visual elements 38 by progressive enlargements through one or more increasing sizes that are each proportional to a distance of the user's hand 342 from the display screen 404. For example and with reference to FIGS. 5-12, the visual elements including the Health hyperlink 504 and Politics hyperlink 514 selectable visual elements are progressively enlarged as the user's hand 342 moves closer to the display screen 404, until the tip 348 of the user's finger 346 contacts the screen in FIG. 12.

Figure 10:
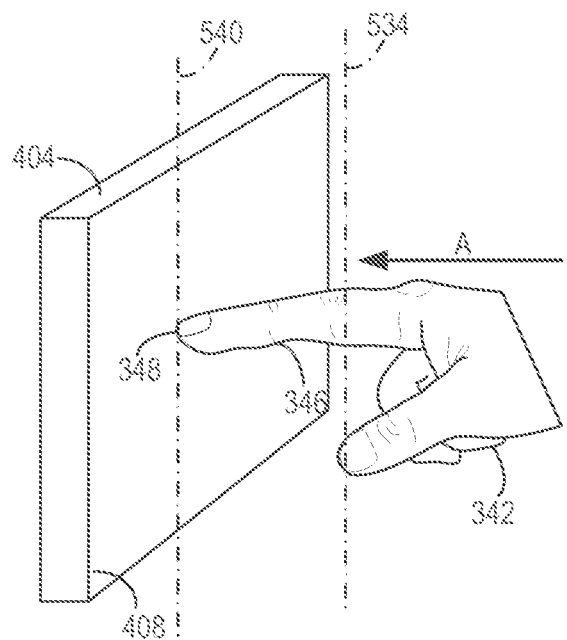
FIG. 10 is a schematic perspective view of the screen and user's hand of FIG. 9.
Figure 11:
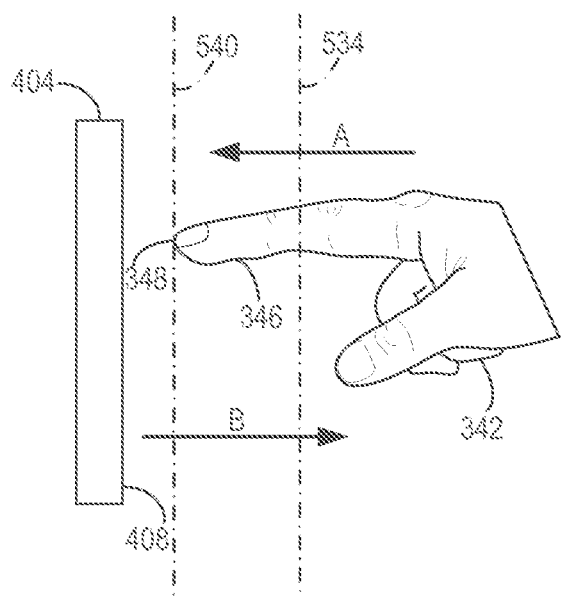
FIG. 11 is a schematic side view of the screen and user's hand of FIG. 9.
Figure 12:
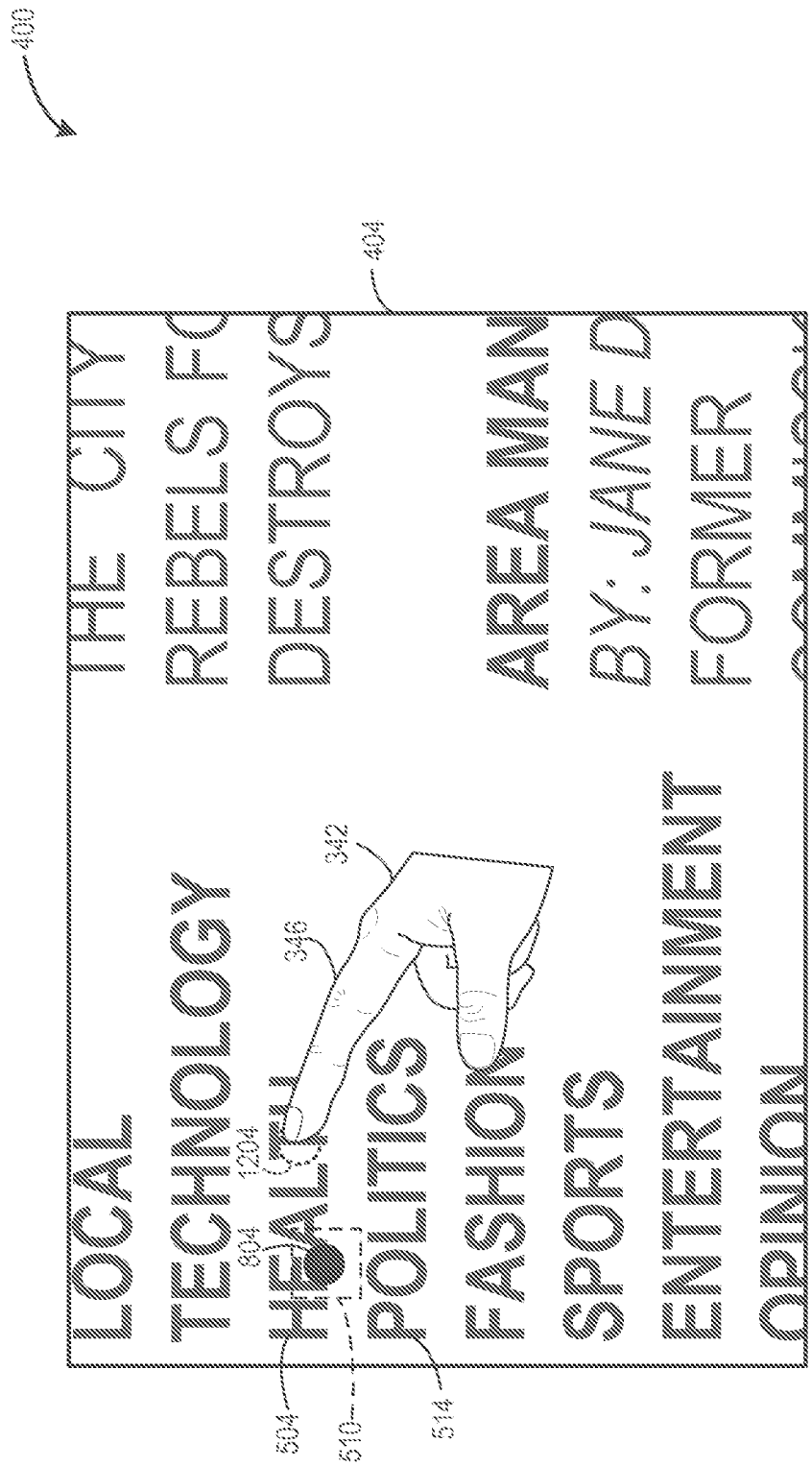
FIG. 12 is a schematic view of the screen of FIG. 9 showing the user's finger touching the screen and the visual elements further enlarged.

In the examples shown in FIGS. 5-12, the visual elements 38 are enlarged through 3 increasing sizes, which together may comprise a predetermined amount, until the elements are displayed in an enlarged size as shown in FIG. 12. It will be appreciated that in other examples the visual elements 38 may be enlarged through 2, 4, 5 or more increasing sizes. As noted above, in some examples the visual elements 38 may be enlarged independent of the distance between the user's hand 342 and the display screen 404. In other examples, each of the 2 or more increasing sizes may be inversely proportional to the corresponding distance of the user's hand 342 from the display screen 404.

As shown in FIGS. 5-12, in some examples the location of the locked gaze location 510 may be maintained in an approximately fixed location relative to the visual elements 38 as the visual elements are enlarged. Additionally, the webpage 400 shown in FIG. 5 may comprise a full view of the webpage in which the visual elements 38 comprising the webpage have not been enlarged. As shown in FIGS. 8-12, it will be appreciated that as the user interface system 10 enlarges the visual elements 38, one or more portions of the webpage 400 that are displayed and visible in the full view of FIG. 5 will not be displayed or visible as the visual elements are enlarged.

In some examples, as the visual elements 38 are enlarged, the locked gaze location 510 may be translated toward the center of the display screen 404. Where the location of the locked gaze location 510 is also maintained relative to the visual elements 38 as they are enlarged, the visual elements are correspondingly moved toward the center of the screen, and the proportional spaced relationships among the elements are also maintained. In one example, two simultaneous geometric transformations of the visual elements 38 may be performed—translating the locked gaze location 510 to the center of the display screen 404 and scaling up all of the displayed visual elements around that point. In some examples in which scaling of the visual elements 38 is performed via animation, for each frame of the animation three geometric transformations of the visual elements may be performed—translating the visual elements at the locked gaze location to a geometric origin (such as the top-left corner of a view's frame), scaling the visual elements about that origin, and translating the visual elements from the origin to the center of the display screen.

In another example, when the locked gaze location is positioned near a peripheral edge of the displayed content, moving that location to the center of the display screen 404 can result in a blank area onscreen, even after scaling up the visual elements 38. For example and with reference to FIG. 5, if the locked gaze location 510 is moved to the center of the display screen 404 and the visual elements 38 are correspondingly translated and scaled, there will be a blank area on the left side of the display screen 404, even after scaling up the content. Accordingly, in this example the locked gaze location 510 may be moved towards the center of the display screen 404 by a limited amount that is sufficient to bring the left edge of the enlarged visual elements 38 flush with the left edge of the screen. It will be appreciated that such limited translations of the locked gaze location may be performed when the locked gaze location is near any edge of the display screen.

In some examples, the scaling module 14 may be configured to monitor the user's use of the user interface system 10 over time. Based on the user's use, the scaling module 14 may modify the predetermined amount by which one or more visual elements are scaled to a user-specific amount. The scaling module 14 may then programmatically scale one or more visual elements by the user-specific amount to a user-specific size.

In one example and with reference to FIG. 12, the scaling module may determine the user-specific amount by averaging user adjustments made by the user to the enlarged size of the Health hyperlink 504 selectable visual element and/or other enlarged visual elements over a predetermined number of user adjustments. For example, the user may repeatedly view webpages from The Post news source, such as the webpage 400 shown in FIGS. 5-12. On 3 separate occasions, after the scaling module 14 has programmatically scaled a visual element 38 by a predetermined amount equal to, for example, 20% to an enlarged size, the user may have further enlarged the visual element to a larger size. For example, the user may have used a reverse-pinch touch gesture to further enlarge the visual element.

On the 3 occasions, the user may have further increased the enlarged size by an additional 4%, 8% and 6%. Accordingly, the scaling module 14 may average these 3 additional scale amounts to arrive at an average additional scale amount of 6%. The scaling module 14 may then add this additional amount of 6% to the predetermined amount of 20% to arrive at a user-specific amount of 26%. Going forward, the scaling module 14 may then programmatically scale visual elements by the user-specific amount of 26%. Advantageously, this customized, user-specific amount may more closely match the preferences of individual users.

In other examples, after the scaling module 14 has programmatically scaled a visual element 38 by a predetermined amount equal to, for example, 20% to an enlarged size, the user may have reduced the visual element to a smaller size on multiple occasions. For example, the user may have used a pinch touch gesture to shrink the visual element and create more visual context around the element. Accordingly, the scaling module 14 may average these multiple reduction amounts to arrive at an average reduced scale amount that is subtracted from the predetermined amount to arrive at a revised user-specific amount. Going forward, the scaling module 14 may then programmatically scale visual elements by the revised user-specific amount.

In other examples, the scaling module may determine the user-specific amount by determining an identity of the user. Based on the user identity, the scaling module 14 may modify the predetermined amount of scale to a user-specific amount. The scaling module 14 may then programmatically scale one or more visual elements by the user-specific amount to a user-specific size.

In one example, the user interface system 10 may determine an identity of the user via user input of log in data. In other examples the user interface system 10 may determine an identity of the user via user biometrics such as, for example, eye information received from the gaze tracking system 40, voice recognition information received from the microphone system 52, and/or facial recognition information received from the optical sensor system 44. It will be appreciated that any other suitable user biometrics may also be used to determine an identity of the user. The user interface system 10 may then access a user profile corresponding to the identity of the user, and may retrieve a user-specific size for programmatically scaling visual elements.

FIG. 12 schematically shows the tip 348 of the user's finger 346 contacting the surface 408 of the display screen 404 at a location corresponding to the Health hyperlink 504 selectable visual element. Contact of the fingertip is visually indicated on the display screen 404 by a touch indicator 1204. In this manner, the user may select this hyperlink and navigate to the corresponding webpage. In some examples the user interface system 10 may enable a user to select a selectable visual element without physically touching the display screen 404. For example and as described in more detail below, the user interface system 10 may utilize one or more planes to lock a gaze location, scale the visual element, and/or select the visual element. In some examples, the one or more planes may be parallel to the surface 408 of the display screen 404. The planes may be generated and located by the scaling module 14, and may be preset with respect to a particular display 34. In some examples, the location of the one or more planes may be set and/or calibrated by a user. In other examples, the scaling module 14 may utilize interaction data reflecting a user's use of the user interface system 10 to programmatically determine one or more locations of the planes that are more comfortable for a user.

In one example and with reference to FIGS. 3 and 5-7, the user interface system 10 may define a plane 534 between the first user 304 and the screen 404. The user's hand 342 may be moving in a direction of action arrow A toward the screen 404. Using the depth tracking data 86, the scaling module 14 may determine that the tip 348 of the user's finger 346 on the user's hand 342 crosses the plane 534, which corresponds to a user intention to select a visual element 38, such as the Health hyperlink 504. In response to the user's hand 342 crossing the plane 534, the scaling module 14 may lock the locked gaze location 510 on the screen 404 and programmatically scale the Health hyperlink 504 and other visual elements. For example, the scaling module 14 may animate the hyperlink and other visual elements to smoothly grow from their initial sizes as shown in FIG. 5 to the enlarged sizes as shown in FIG. 12.

Figure 9:
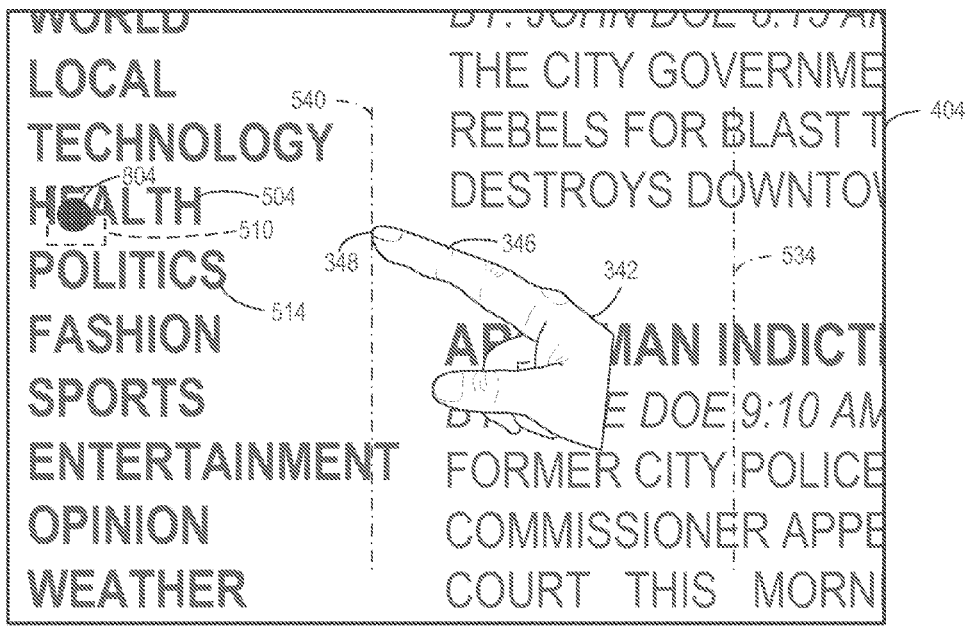
FIG. 9 is a schematic view of the screen of FIG. 8 showing the user's hand still closer to the screen and the visual elements further enlarged.

With reference now to FIGS. 9-11, in some examples the user interface system 10 may also define an additional plane 540 between the plane 534 and the display screen 404. Using the depth tracking data, the scaling module 14 may determine that the tip 348 of the user's finger 346 on the user's hand 342 subsequently crosses the additional plane 540, as shown in FIGS. 9-11. It will be appreciated that for clarity of illustration, the display screen 404 of FIG. 10 is schematically illustrated without the visual elements and other graphics displayed on the screen in FIG. 9. In response to the user's hand crossing the additional plane 540, the user interface system 10 may cause the Health hyperlink 504 selectable visual element that is partially captured by the locked gaze location 510 to be selected. In this manner, the user interface system 10 may enable the user to select visual elements without physically touching the display screen 404.

In some examples, the scaling module 14 may be configured to provide feedback to the user related to the user's interactions with the display device. For example, the scaling module 14 may provide gaze lock feedback when the locked gaze location is locked. With reference to FIG. 5, such gaze lock feedback may comprise displaying the box 510 that indicates the locked gaze location. In other examples, the gaze lock feedback may comprise other visual feedback, audio feedback, haptic feedback, and/or any other suitable feedback.

In some examples, the scaling module 14 may provide progressive feedback indicating a position of the user's hand relative to the display device. For example and with reference to FIGS. 5 and 8, as the user's finger moves closer to the display screen 404, an empty circle 804 may be displayed within the box indicating the locked gaze location 510. As shown in FIG. 9, as the user's finger moves closer the empty circle 804 may be filled. In this manner, the user interface system 10 provides a visual indicator that responds to the user's movement of the user's finger 346. In other examples, the scaling module 14 may provide progressive feedback indicating a position of the user's hand relative to the plane 534, the additional plane 540, or a visual element 38.

In some examples, as the user's hand moves away from display screen 404, the scaling module 14 may utilize the location of the hand to scale the enlarged visual elements 38 back to their initial size. For example and with reference to FIG. 11, as the user's hand 342 moves in the direction of action arrow B away from the screen 404, the scaling module 14 may scale the enlarged visual elements to their initial size when the tip 348 of the user's finger 346 passes the additional plane 540 or the plane 534. In this manner, a user may easily downscale the visual elements 38 by simple withdrawing her hand beyond a predetermined location.

In some examples, the scaling module 14 may not programmatically scale a visual element where at least a portion of the visual element is included in the locked gaze location. In one example, the locked gaze location may encompass portions of one or more non-selectable visual elements 38 on the webpage 400, and may not encompass a portion of a selectable visual element 38. In this example, based on the locked gaze location not including a selectable visual element 38, when the user's hand is at the predetermined location, the scaling module 14 may not programmatically scale the non-selectable visual elements.

Advantageously, in this example the user may be afforded additional user interface capabilities without triggering a programmatic scale. For example, the user may move the user's finger toward the display screen 404 to trigger a panning or scrolling function that allows the user to pan or scroll the webpage 400 in one or more directions, without triggering a programmatic scale.

With reference again to FIG. 3, it will be appreciated that the above-described methods and processes may be utilized with display devices other than the touch screen tablet computer 312, such as the wall-mounted display device 316, the HMD device 200, and any other suitable display devices. For example, second user 330 may utilize the user interface system 10 to interact with the wall-mounted display 316 via first and second planes in a manner similar to that described above. In another example, third user 334 may utilize user interface system 10 to interact with virtual image 338. In some examples, locations on the virtual image 338 may correspond to locations of visual elements on the display screen 404 as described above. Accordingly, third user 334 may utilize user interface system 10 to interact with virtual image 338 via one or more planes in a manner similar to that described above.

FIGS. 13A, 13B and 13C illustrate a flow chart of a method 1300 for scaling a visual element according to an embodiment of the present disclosure. The following description of method 1300 is provided with reference to the software and hardware components of the user interface system 10 described above and shown in FIGS. 1-12. It will be appreciated that method 1300 may also be performed in other contexts using other suitable hardware and software components.

With reference to FIG. 13A, at 1302 the method 1300 may include receiving gaze tracking data. At 1304 the method 1300 may include using the gaze tracking data to determine a plurality of gaze locations at which a user is gazing on a screen of the display device. At 1306 the method 1300 may include receiving depth tracking data. At 1308 the method 1300 may include using the depth tracking data to determine that a user's pointer is at a predetermined location. At 1310 the method 1300 may include, in response to determining that the user's pointer is at the predetermined location, locking a locked gaze location on the screen, wherein the locked gaze location includes at least a portion of the visual element.

At 1312 the method 1300 may include ceasing to receive gaze tracking data from the gaze tracking system. At 1314 the method 1300 may include, in response to locking the locked gaze location, programmatically scaling the visual element by a predetermined amount to an enlarged size. At 1316 the method 1300 may include programmatically scaling the visual element by a single step to the enlarged size. At 1318 the method 1300 may include scaling the visual element by progressive enlargements through one or more increasing sizes that are each proportional to a distance of the user's pointer from the screen.

At 1320 the method 1300 may include programmatically scaling the visual element by animating the visual element to grow to the enlarged size independent of the distance of the user's pointer from the screen. At 1322 the method 1300 may include receiving a user input selecting the visual element at the enlarged size. With reference now to FIG. 13B, at 1324 the method 1300 may include monitoring the user's use of the user interface system. At 1326 the method 1300 may include, based on the user's use, modifying the predetermined amount to a user-specific amount. At 1328 the method 1300 may then include programmatically scaling the visual element by the user-specific amount to a user-specific size.

At 1330 the method 1300 may include determining the user-specific amount by averaging a plurality of user adjustments to the enlarged size. At 1332 the method 1300 may include determining an identity of the user. At 1334 the method 1300 may include determining the identity of the user via user input of log in data. At 1336 the method 1300 may include determining the identity of the user via user biometrics selected from the group consisting of eye information received from the gaze tracking system, voice recognition information and facial recognition information.

At 1338 the method 1300 may include, based on the user identity, modifying the predetermined amount to a user-specific amount. At 1340 the method 1300 may then include programmatically scaling the visual element by the user-specific amount to a user-specific size.

With reference now to FIG. 13C, at 1342 the method 1300 may include defining a first plane between the user and the screen of the display device. At 1344 the method 1300 may include, using the depth tracking data, determining that the user's pointer crosses the first plane. At 1346 the method 1300 may include, in response to determining that the user's pointer crosses the first plane, locking the locked gaze location on the screen and programmatically scaling the visual element.

At 1348 the method 1300 may include defining a second plane between the first plane and the screen of the display device. At 1350 the method 1300 may include, using the depth tracking data, determining that the user's pointer subsequently crosses the second plane. At 1352 the method 1300 may include, in response to determining that the user's pointer crosses the second plane, selecting the visual element. At 1354 the method 1300 may include providing feedback to the user via the display device comprising gaze lock feedback when the locked gaze location is locked and progressive feedback indicating a position of the user's pointer relative to the display device.

It will be appreciated that method 1300 is provided by way of example and is not meant to be limiting. Therefore, it is to be understood that method 1300 may include additional and/or alternative steps than those illustrated in FIGS. 13A, 13B and 13C. Further, it is to be understood that method 1300 may be performed in any suitable order. Further still, it is to be understood that one or more steps may be omitted from method 1300 without departing from the scope of this disclosure.

Figure 14:
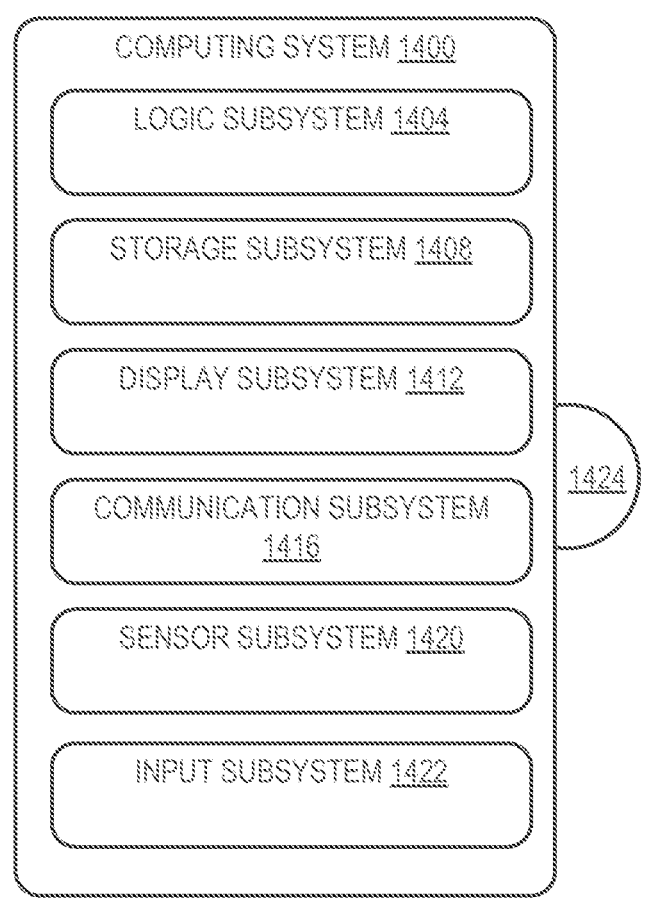
FIG. 14 is a simplified schematic illustration of an embodiment of a computing device.

FIG. 14 schematically shows a nonlimiting embodiment of a computing system 1400 that may perform one or more of the above described methods and processes. Computing device 22 may take the form of computing system 1400. Computing system 1400 is shown in simplified form. It is to be understood that virtually any computer architecture may be used without departing from the scope of this disclosure. In different embodiments, computing system 1400 may take the form of a mainframe computer, server computer, desktop computer, laptop computer, tablet computer, home entertainment computer, network computing device, mobile computing device, mobile communication device, gaming device, etc. As noted above, in some examples the computing system 1400 may be integrated into a display device.

As shown in FIG. 14, computing system 1400 may include a logic subsystem 1404, a storage subsystem 1408, a display subsystem 1412, a communication subsystem 1416, a sensor subsystem 1420, and an input subsystem 1422. Computing system 1400 may optionally include other subsystems and components not shown in FIG. 14. Computing system 1400 may also include computer readable media, with the computer readable media including computer readable storage media and computer readable communication media. Computing system 1400 may also optionally include other user input devices such as keyboards, mice, game controllers, and/or touch screens, for example. Further, in some embodiments the methods and processes described herein may be implemented as a computer application, computer API, computer library, and/or other computer program product in a computing system that includes one or more computers.

Logic subsystem 1404 may include one or more physical devices configured to execute one or more instructions. For example, the logic subsystem 1404 may be configured to execute one or more instructions that are part of one or more applications, programs, routines, libraries, objects, components, data structures, or other logical constructs. Such instructions may be implemented to perform a task, implement a data type, transform the state of one or more devices, or otherwise arrive at a desired result.

The logic subsystem 1404 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1408 may include one or more physical, persistent devices configured to hold data and/or instructions executable by the logic subsystem 1404 to implement the herein described methods and processes. When such methods and processes are implemented, the state of storage subsystem 1408 may be transformed (e.g., to hold different data).

Storage subsystem 1408 may include removable media and/or built-in devices. Storage subsystem 1408 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1408 may include devices with one or more of the following characteristics: volatile, nonvolatile, dynamic, static, read/write, read-only, random access, sequential access, location addressable, file addressable, and content addressable.

In some embodiments, aspects of logic subsystem 1404 and storage subsystem 1408 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 14 also shows an aspect of the storage subsystem 1408 in the form of removable computer readable storage media 1424, which may be used to store data and/or instructions executable to implement the methods and processes described herein. Removable computer-readable storage media 1424 are physical devices that may take the form of CDs, DVDs, HD-DVDs, Blu-Ray Discs, EEPROMs, and/or floppy disks, among others, and hold the data and/or instructions in a persistent manner, for a finite duration.

In contrast, in some embodiments aspects of the instructions described herein may be propagated by computer-readable communications media, such as a communications bus, port, or optical fiber, etc., in a transitory fashion by a pure signal (e.g., an electromagnetic signal, an optical signal, etc.) that is not held by a physical device for at least a finite duration.

Display subsystem 1412 may be used to present a visual representation of data held by storage subsystem 1408. As the above described methods and processes change the data held by the storage subsystem 1408, and thus transform the state of the storage subsystem, the state of the display subsystem 1412 may likewise be transformed to visually represent changes in the underlying data. The display subsystem 1412 may include one or more display devices utilizing virtually any type of technology. Such display devices may be combined with logic subsystem 1404 and/or storage subsystem 1408 in a shared enclosure, or such display devices may be peripheral display devices. With reference also to FIG. 1, the display subsystem 1412 may include, for example, the display system 36 of display 34 and/or the display system 66 and transparent display 68 of the HMD device 54.

When included, communication subsystem 1416 may be configured to communicatively couple computing system 1400 with one or more networks and/or one or more other computing devices. Communication subsystem 1416 may include wired and/or wireless communication devices compatible with one or more different communication protocols. As nonlimiting examples, the communication subsystem 1416 may be configured for communication via a wireless telephone network, a wireless local area network, a wired local area network, a wireless wide area network, a wired wide area network, etc. In some embodiments, the communication subsystem may allow computing system 1400 to send and/or receive messages to and/or from other devices via a network such as the Internet.

Sensor subsystem 1420 may include one or more sensors configured to sense different physical phenomenon (e.g., visible light, infrared light, sound, acceleration, orientation, position, etc.) as described above. Sensor subsystem 1420 may be configured to provide sensor data to logic subsystem 1404, for example. As described above, such data may include gaze tracking information, depth tracking information, image information, audio information, ambient lighting information, position information, motion information, user location information, and/or any other suitable sensor data that may be used to perform the methods and processes described above.

When included, input subsystem 1422 may comprise or interface with one or more sensors or user-input devices such as a game controller, gesture input detection device, voice recognizer, inertial measurement unit, keyboard, mouse, or touch screen. In some embodiments, the input subsystem 1422 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "module" may be used to describe an aspect of the user interface system 10 that is implemented to perform one or more particular functions. In some cases, such a module may be instantiated via logic subsystem 1404 executing instructions held by storage subsystem 1408. It is to be understood that different modules may be instantiated from the same application, code block, object, library, routine, API, function, etc. Likewise, the same module may be instantiated by different applications, code blocks, objects, routines, APIs, functions, etc. The term "module" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A user interface system for scaling a visual element displayed via a display device, the user interface system comprising:
a computing device operatively connected to the display device, wherein the display device includes a gaze tracking system and a display system for presenting the visual element; and
a scaling module executed by a processor of the computing device, the scaling module configured to:
receive gaze tracking data from the gaze tracking system;
using the gaze tracking data, determine a plurality of gaze locations at which a user is gazing on a screen of the display device;
receive depth tracking data from a depth tracking system;
using the depth tracking data, determine that a user's pointer is at a predetermined location;
in response to determining that the user's pointer is at the predetermined location using the depth tracking data, lock a locked gaze location on the screen, wherein the locked gaze location includes at least a portion of the visual element;

in response to locking the locked gaze location, programmatically scale the visual element by a predetermined amount to an enlarged size;
receive a user input selecting the visual element at the enlarged size;
subsequently monitor the user's use of the user interface system over time;
based on the user's use over time, modify the predetermined amount to a user-specific amount; and
programmatically scale the visual element by the user-specific amount to a user-specific size.

2. The user interface system of claim 1, wherein the scaling module is further configured to, in response to determining that the user's pointer is at the predetermined location, cease receiving the gaze tracking data from the gaze tracking system.

3. The user interface system of claim 1, wherein the scaling module is further configured to programmatically scale the visual element by animating the visual element to grow to the enlarged size independent of a distance of the user's pointer from the screen.

4. The user interface system of claim 1, wherein the scaling module is further configured to programmatically scale the visual element either by a single step to the enlarged size or by progressive enlargements of the visual element through one or more increasing sizes that are each proportional to a distance of the user's pointer from the screen.

5. The user interface system of claim 1, wherein the scaling module is further configured to determine the user-specific amount by averaging a plurality of user adjustments to the enlarged size.

6. The user interface system of claim 1, wherein the scaling module is further configured to:
define a plane between the user and the screen of the display device;
using the depth tracking data, determine that the user's pointer crosses the plane; and
in response to determining that the user's pointer crosses the plane, lock the locked gaze location on the screen and programmatically scale the visual element.

7. The user interface system of claim 1, wherein the scaling module is further configured to:
define a first plane between the user and the screen of the display device;
define a second plane between the first plane and the screen of the display device;
using the depth tracking data, determine that the user's pointer crosses the first plane;
in response to determining that the user's pointer crosses the first plane, lock the locked gaze location on the screen;
using the depth tracking data, determine that the user's pointer subsequently crosses the second plane; and
in response to determining that the user's pointer crosses the second plane, select the visual element.

8. The user interface system of claim 1, wherein the scaling module is further configured to provide feedback to the user via the display device comprising gaze lock feedback when the locked gaze location is locked and progressive feedback indicating a position of the user's pointer relative to the display device.

9. A method for scaling a visual element displayed via a display device, the method comprising:
receiving gaze tracking data;
using the gaze tracking data, determining a plurality of gaze locations at which a user is gazing on a screen of the display device;
receiving depth tracking data;
using the depth tracking data, determining that a user's pointer is at a predetermined location;
in response to determining that the user's pointer is at the predetermined location using the depth tracking data, locking a locked gaze location on the screen, wherein the locked gaze location includes at least a portion of the visual element;
in response to locking the locked gaze location, programmatically scaling the visual element by a predetermined amount to an enlarged size;
receiving a user input selecting the visual element at the enlarged size;
subsequently monitoring the user's use of the user interface system over time;
based on the user's use over time, modifying the predetermined amount to a user-specific amount; and
programmatically scaling the visual element by the user-specific amount to a user-specific size.

10. The method of claim 9, further comprising, in response to determining that the user's pointer is at the predetermined location, ceasing to receive the gaze tracking data from the gaze tracking system.

11. The method of claim 9, wherein programmatically scaling the visual element further comprises either scaling the visual element by a single step to the enlarged size or scaling the visual element by progressive enlargements through one or more increasing sizes that are each proportional to a distance of the user's pointer from the screen.

12. The method of claim 9, further comprising determining the user-specific amount by averaging a plurality of user adjustments to the enlarged size.

13. The method of claim 9, further comprising:
determining an identity of the user;
based on the user identity, modifying the predetermined amount to a user-specific amount; and
programmatically scaling the visual element by the user-specific amount to a user-specific size.

14. The method of claim 13, wherein determining the identity of the user is performed via user input of log in data or via user biometrics selected from the group consisting of eye information received from the gaze tracking system, voice recognition information and facial recognition information.

15. The method of claim 9, further comprising:
defining a plane between the user and the screen of the display device;
using the depth tracking data, determining that the user's pointer crosses the plane; and
in response to determining that the user's pointer crosses the plane, locking the locked gaze location on the screen and programmatically scaling the visual element.

16. The method of claim 9, further comprising providing feedback to the user via the display device comprising gaze lock feedback when the locked gaze location is locked and progressive feedback indicating a position of the user's pointer relative to the display device.

17. A method for scaling a visual element displayed via a display device, the method comprising:
receiving gaze tracking data;
using the gaze tracking data, determining a plurality of gaze locations at which a user is gazing on a screen of the display device;
receiving depth tracking data;
using the depth tracking data, determining that a user's pointer is at a predetermined location;
in response to determining that the user's pointer is at the predetermined location using the depth tracking data, locking a locked gaze location on the screen, wherein the locked gaze location includes at least a portion of the visual element;

in response to locking the locked gaze location, programmatically scaling the visual element by a predetermined amount to an enlarged size;

receiving a first user input selecting the visual element at the enlarged size;

monitoring the user's subsequent use of the user interface system;

based on the user's subsequent use, modifying the predetermined amount to a user-specific amount;

programmatically scaling the visual element by the user-specific amount to a user-specific size; and receiving a second user input selecting the visual element at the user-specific size.

18. The method of claim 17, further comprising determining the user-specific amount by averaging a plurality of user adjustments to the enlarged size.

\* \* \* \* \*